United States Patent
Kasher et al.

(10) Patent No.: US 9,787,538 B2
(45) Date of Patent: Oct. 10, 2017

(54) WIRELESS GIGABIT-ENABLED DEVICE CONFIGURATION

(71) Applicant: Intel IP Corporation, Santa Clara, CA (US)

(72) Inventors: Assaf Kasher, Haifa (IL); Avi Tel-Or, Aseret (IL); Naom Kogan, Tel-Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 158 days.

(21) Appl. No.: 14/884,159

(22) Filed: Oct. 15, 2015

(65) Prior Publication Data

US 2017/0111218 A1    Apr. 20, 2017

(51) Int. Cl.
*H04L 12/24* (2006.01)
*H04B 17/318* (2015.01)
*H04W 24/10* (2009.01)

(52) U.S. Cl.
CPC ....... *H04L 41/0803* (2013.01); *H04B 17/318* (2015.01); *H04W 24/10* (2013.01)

(58) Field of Classification Search
CPC ... H04L 41/0803; H04B 17/318; H04W 24/10
See application file for complete search history.

(56) References Cited

U.S. PATENT DOCUMENTS

| | | | | |
|---|---|---|---|---|
| 2013/0343247 | A1* | 12/2013 | Kasher | H04W 52/0209 370/311 |
| 2014/0369330 | A1* | 12/2014 | Sinha | H04W 8/005 370/338 |

* cited by examiner

*Primary Examiner* — Siming Liu
(74) *Attorney, Agent, or Firm* — Schiff Hardin LLP (57) ABSTRACT

A wireless high frequency directed communication-enabled device configured to determine a relative direction of a wireless high frequency directed communication-enabled station (e.g., dock or Access Point), and when in extended desktop mode and without user intervention, is configured with the relative direction of the wireless high frequency directed communication-enabled station. Also, the wireless high frequency directed communication-enabled device determines a relative direction for a wireless high frequency directed communication-enabled station, and is configured to display a direction and/or transmission quality for the wireless high frequency directed communication-enabled station.

22 Claims, 6 Drawing Sheets

WIRELESS GIGABIT-ENABLED DEVICE CONFIGURATION

TECHNICAL FIELD

The present disclosure generally relates to a Wireless Gigabit (WiGig)-enabled device, and more specifically, to configuration of a WiGig-enabled device.

BACKGROUND

When a Wireless Gigabit (WiGig)-enabled device, such as a laptop computer, operating over the unlicensed 60 GHz frequency band is connected to a dock with an external display, and a user wishes to use the external display in the extended desktop mode, the user manually selects whether the external display is positioned to the left or to the right of the laptop computer display. This selection affects the movement of the mouse when the mouse reaches an edge of either the laptop computer display or the external display, that is, whether the mouse continues from the right of the laptop computer display to the left of the external monitor, or from the left of the laptop computer display to the right of the external monitor. The selection also affects whether windows can be moved between the displays from the right side or the left side of the laptop computer display.

Further, when the user attempts to connect the laptop computer, or other WiGig-enabled device, to a WiGig-enabled dock or access point (AP), the user may be presented with a plurality of available docking stations/APs as connection options.

DESCRIPTION OF THE ASPECTS

The present disclosure is directed to a WiGig-enabled device configured to determine a relative direction of a WiGig-enabled station (e.g., dock or Access Point), and when in extended desktop mode and without user intervention, is configured with the relative direction of the WiGig-enabled station. Also, the WiGig-enabled device determines a relative direction for a WiGig-enabled station, and is configured to display a direction and/or transmission quality for the WiGig-enabled station.

Figure 1A:
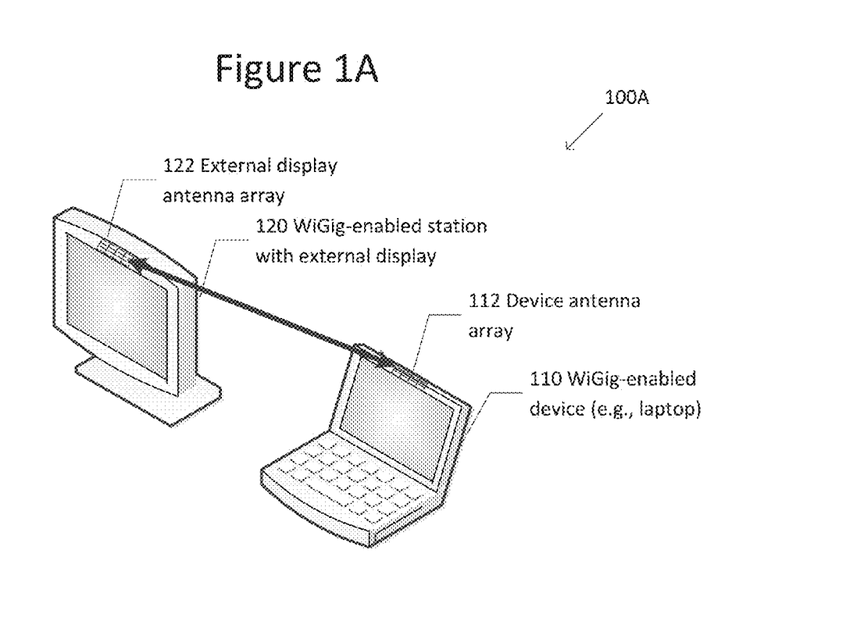
FIGS. 1A and 1B illustrate schematic diagrams of a WiGig system according to this disclosure.
Figure 1B:
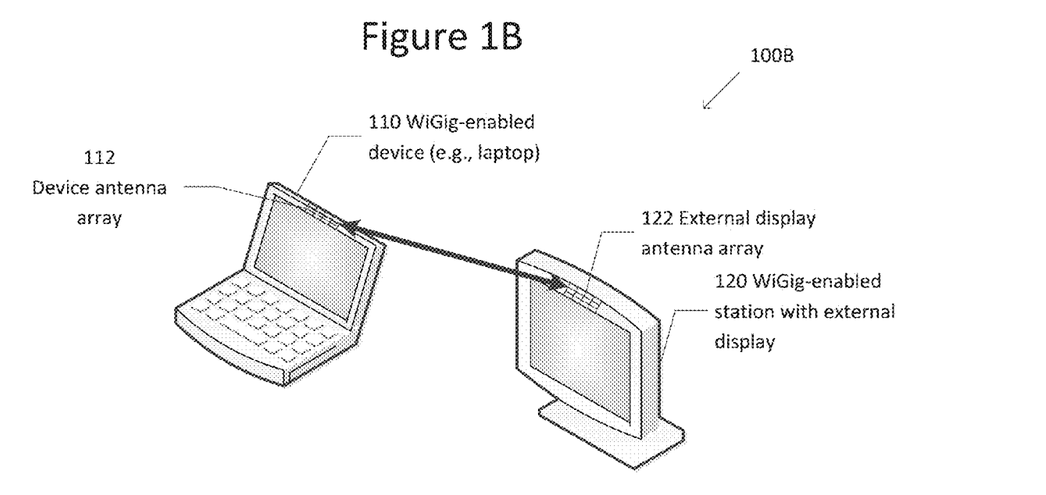

FIGS. 1A and 1B illustrate schematic diagrams of a WiGig system 100 in two different configurations according to this disclosure.

The WiGig system 100 comprises a WiGig-enabled device 110 and a WiGig-enabled dock having an external display 120 (hereinafter referred to as "WiGig-enabled external display"). The WiGig-enabled device 110 may be a laptop, tablet, mobile phone, or other similar device. The WiGig-enabled device 110 transmits and receives signals via an antenna array 112. The WiGig-enabled external display 120 also has an antenna array 122. Each antenna array may be a phased array having a set of individual antennas configured to transmit and/or receive radio signals. The signals from the individual antennas are combined in order to achieve improved performance over that of a single antenna. The antenna arrays 112, 122 shown are for illustration purposes. In reality these antenna arrays 112, 122 would likely be hidden within the WiGig-enabled device 110 and the WiGig-enabled external display 120, respectively. Each antenna array 112, 122 may alternatively be a switch beam antenna, a mechanically moving antenna, or other directional antenna.

FIGS. 1A and 1B show typical scenarios for relative placement of a WiGig-enabled device 110 and a WiGig-enabled external display 120. FIG. 1A shows a configuration in which the WiGig-enabled device 110 is to the right of the WiGig-enabled external display 120. Alternatively, FIG. 1B shows a configuration in which the WiGig-enabled device 110 is to the left of the WiGig-enabled external display 120.

The WiGig-enabled device 110 is connected to the WiGig-enabled display 120 using WiGig 60 GHz communication. Once a connection between the device 110 and display 120 is established, a commonly known beamforming training is performed to find a best direction for the antenna arrays 112, 122 to transmit and receive. This direction is usually a line of sight direction between the WiGig-enabled device 110 and the WiGig-enabled external display 120.

The beamforming process starts with the WiGig-enabled external display 120 performing a sector sweep by transmitting in sectors (i.e., "indexes of transmission") having high gain directions, and the WiGig-enabled device 110 receiving the transmissions omni-directionally. The number of sectors in which an antenna array 112, 122 transmits and receives depends on the array's number of individual antennas, such as 16 or 32. The external display antenna array 122 may transmit from −90° to +90° relative to the WiGig-enabled device 110. Next, the WiGig-enabled external display 120 goes into receive mode, and the WiGig-enabled device antenna array 112 transmits from −90° to +90°. Assuming the devices have a line of sight connection, then the WiGig-enabled external display 120 finds the best transmit sector and determines its angle. It is appreciated that the angles −90° to +90° are merely examples, and the disclosure is not necessarily limited thereto. Also, beamforming training is known, such as part of the IEEE 802.11ad standard, and for the sake of brevity, will not be described further here.

Using this best transmit sector angle, the WiGig-enabled device 110 can determine whether the WiGig-enabled external display 120 is to the left of the WiGig-enabled device 110 or to the right. Then, if the user of the WiGig-enabled device 110 chooses the extended desktop configuration, the information from the beamforming direction is used as an input to the display driver, to set the extended desktop, without user intervention, for a left WiGig-enabled external display 120 configuration (FIG. 1A) or a right WiGig-enabled external display 120 configuration (FIG. 1B).

The wireless connection between the WiGig-enabled device 110 and the WiGig-enabled external display 120 may not be a constant connection. When a user of the WiGig-enabled device 110 moves to a different position relative to the WiGig-enabled external display 120, or from one WiGig-enabled external display 120 to another, the setup may be again configured without user intervention.

Figure 2:
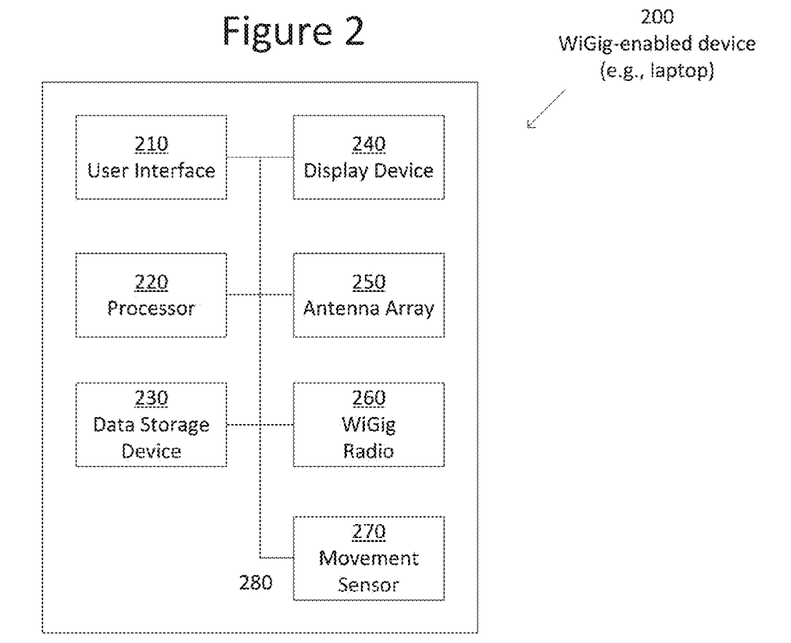
FIG. 2 illustrates a block diagram of an exemplary WiGig-enabled device for use with the systems and methods according to this disclosure.

FIG. 2 illustrates a block diagram of an exemplary WiGig-enabled device 200 for use with the systems and methods according to this disclosure. For the purposes of this disclosure, it is understood that the WiGig-enabled device 200 includes at least one WiGig radio 260 for establishing WiGig communications with one or more WiGig-enabled displays, docks and/or access points (AP).

As shown in FIG. 2, the WiGig-enabled device 200 may include a user interface 210 by which a user may communicate with the WiGig-enabled device 200, or with a network with which the WiGig-enabled device 200 is in communication. The user interface 210 in WiGig-enabled device 200 may include any device by which the user may communicate with the WiGig-enabled device 200 including, for example, an integral keyboard, a touchscreen display, and/or a microphone for interpreting voice commands or other like device for data input and exchange with the WiGig-enabled device 200. Virtually any means by which a user may input data and/or instructions to the WiGig-enabled device 200 is contemplated.

The WiGig-enabled device 200 may include one or more local processors 220 for individually undertaking the processing and control functions that are carried out by the WiGig-enabled device 200 for accomplishing data communication via at least the WiGig radio 260. Processor(s) 220 may include at least one processor or microprocessor that interprets and executes instructions and processes data and signals in order to establish and enable WiGig communications in WiGig-enabled device 200. The processor(s) 220 may be programmable general purpose processors, application specific processors, filed programmable arrays or application specific integrated circuits (ASIC).

The WiGig-enabled device 200 may include one or more data storage devices 230. Such data storage device(s) 230 may be used to store data, and operating programs or applications to be used by the WiGig-enabled device 200. Data storage device(s) 230 may include a random access memory (RAM) or another type of dynamic storage device that stores information and instructions for execution by the processor(s) 220. Data storage device(s) 230 may also include a read-only memory (ROM), which may include a ROM device or another type of static storage device that stores static information and instructions for execution by the processor(s) 220. The data storage device(s) 230 will generally be those that are integral to the WiGig-enabled device 200, and not some other data storage device that may be provided external to, and in wireless communication with, the WiGig-enabled device 200. The data storage device(s) 230 may store functions, algorithms and/or settings for reference in establishing and enabling the WiGig communications with the WiGig-enabled device 200.

The WiGig-enabled device 200 may include a display device 240 that may be configured as a display device by which to inform the user regarding operation of the WiGig-enabled device 200 and/or, in combination with the user interface 210, to enable the user to execute applications stored in the WiGig-enabled device 200, or accessible by the WiGig-enabled device 200 when the WiGig-enabled device 200 is in communication with a network via at least a WiGig communication link established via the WiGig radio 260.

The WiGig-enabled device 200 may include an antenna array 250. As discussed above, an antenna array is a set of individual antennas configured to transmit and/or receive radio signals or any antenna system capable of selectively receiving and transmitting in a specific direction. Also, the antenna array 250 may alternatively be a switch beam antenna, a mechanically moving antenna, or other directional antenna.

The WiGig-enabled device 200 may include a WiGig radio 260. The WiGig radio 260 may include an integral WiGig transceiver, or otherwise may include separate transmitter and receiver devices. It should be noted that the WiGig-enabled device 200 may include other radios for establishing communication links in other portions of the licensed or unlicensed radio frequency spectrum including, for example, a Wi-Fi radio or a cellular telephone radio.

The WiGig-enabled device 200 may include a movement sensor 270, such as an accelerometer, a movement detector, a camera, a tracking module, a tracing module and the like, to provide position-related information. The movement sensor 270 may include, or may be included as part of, a hardware module of the WiGig-enabled device 200, e.g., an accelerometer and the like, a software module of the WiGig-enabled device 200, e.g., movement detection software, and/or any combination of hardware and software, e.g., a camera and movement detection software. The movement sensor 270 may provide placement-related information to the processor 220 including the position-related information and/or the orientation-related information in any suitable format.

The processor 220 may receive from the movement sensor 270 placement-related information including first placement-related information indicating a first placement-related attribute of WiGig-enabled device 200 at a first time and second placement-related information indicating a second placement-related attribute of WiGig-enabled device 200 at a second time that is subsequent to the first time. For example, the processor 220 may receive placement-related information from the movement sensor 270 according to a predefined timing scheme, e.g., every second, or the like. In another example, the movement sensor 270 may be capable of providing placement-related information to the processor 220 based on any suitable criterion, for example, when a change in a sensed placement-related attribute is detected, when the change in the sensed placement-related attribute is equal to or greater than a predefined threshold, and the like.

All of the various components of the WiGig-enabled device 200, as depicted in FIG. 2, may be connected by one or more data/control busses 280. The data/control bus(ses) 280 may provide internal communication between the various components of the WiGig-enabled device 200, as all of those components are housed integrally in the WiGig-enabled device 200.

It is anticipated that the various disclosed elements of the WiGig-enabled device 200 may be arranged in combinations of sub-systems as individual components or combinations of components, but regardless of the specific configuration, all of the depicted components may be integral to a single unit that is the WiGig-enabled device 200.

Figure 3:
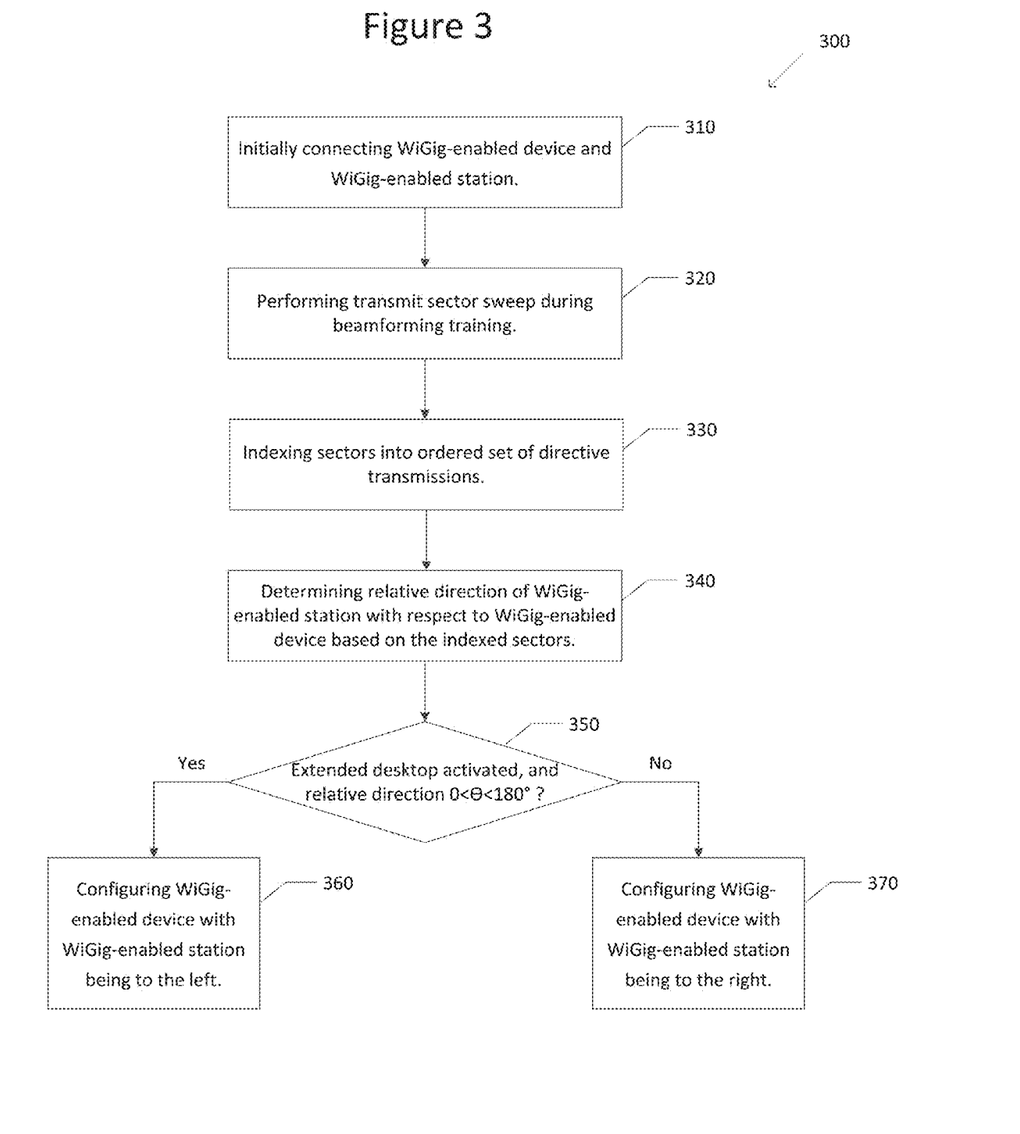
FIG. 3 illustrates a flowchart of a method of configuring a WiGig-enabled device according to this disclosure.

FIG. 3 illustrates a flowchart 300 of a method of configuring a WiGig-enabled device 110 to a WiGig-enabled external station 120 according to this disclosure. The WiGig-enabled external station 120 may be a dock with an external display.

In Step 310, the WiGig-enabled device 110 and the WiGig-enabled station 120 are initially connected.

In Step 320, a transmit sector sweep is performed during a beamforming training between the WiGig-enabled device 110 and a WiGig-enabled station 120.

In Step 330, the sectors are indexed into an ordered set of directive transmissions, which is a known part of the beamforming training.

In Step 340, a relative direction of the WiGig-enabled station 120 with respect to the WiGig-enabled device 110 is determined based on the indexed sectors.

In Step 350, if the WiGig-enabled device 110 is in extended desktop mode, and the relative position θ of the WiGig-enabled station with external display 120 is, for example, 0<θ<180°, then the WiGig-enabled device 110 is configured such that the WiGig-enabled external display 120 is to its left (Step 360, shown in FIG. 1A), and otherwise, to its right (Step 370, shown in FIG. 1B).

While the disclosure shows the WiGig-enabled device 110 being configured with respect to a single WiGig-enabled station with external display 120, the disclosure is not limited in this respect. The WiGig-enabled device 110 may be connected to multiple WiGig-enabled stations with external displays 120, all of them WiGig-enabled. The WiGig-enabled device 110 determines a direction to each of the WiGig-enabled stations with external displays 120, and for each, determines whether the WiGig-enabled station with external display 120 is placed to the left or to the right of WiGig-enabled device 110. Using this information, the WiGig-enabled device 110 can then automatically determine an order of the WiGig-enabled stations with external displays 120 from left to right and correctly configures the extended display mode.

Figure 4:
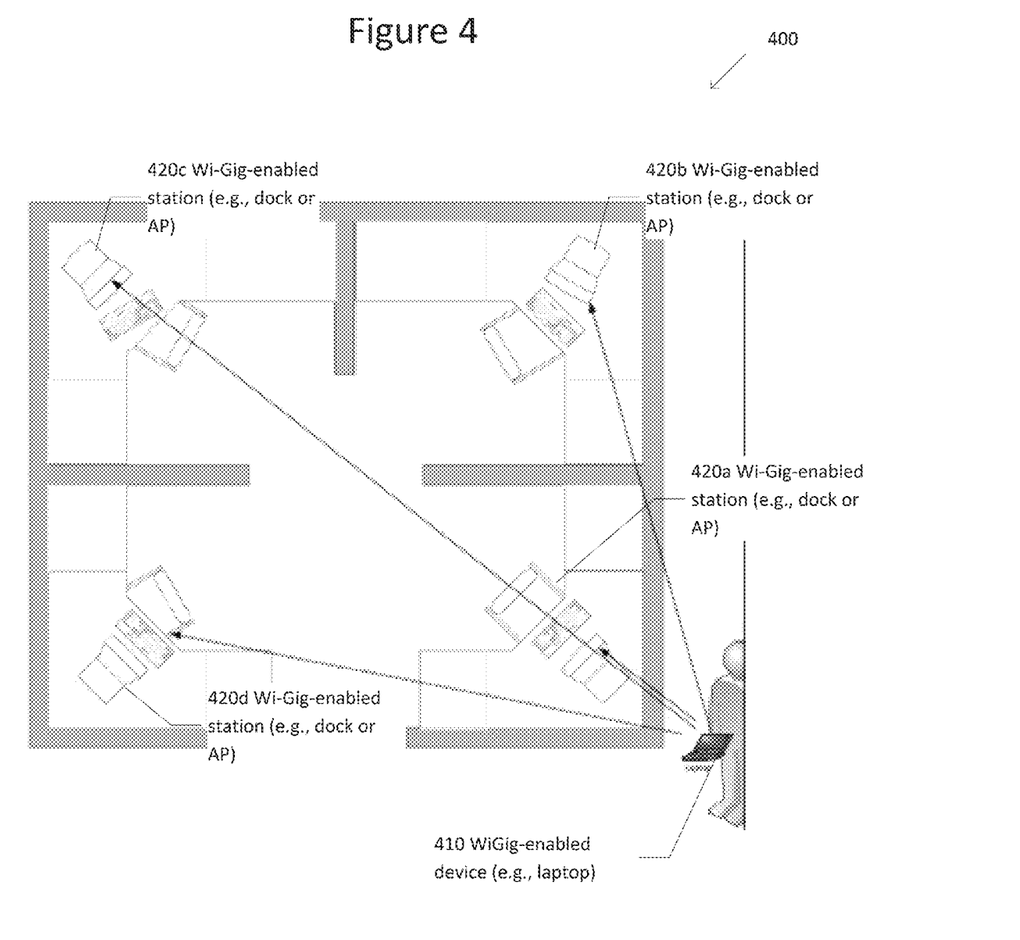
FIG. 4 illustrates a schematic diagram of a WiGig system according to this disclosure.

FIG. 4 illustrates a schematic diagram of a WiGig system 400 according to this disclosure.

The WiGig system 400 comprises a WiGig-enabled device 410 and a plurality of WiGig-enabled stations 420a-e (collectively, 420). The WiGig-enabled device 410 is similar to the WiGig-enabled devices 110, 200 discussed above. The WiGig-enabled stations 420 are similar to the WiGig-enabled station 120 discussed above.

Figure 5:
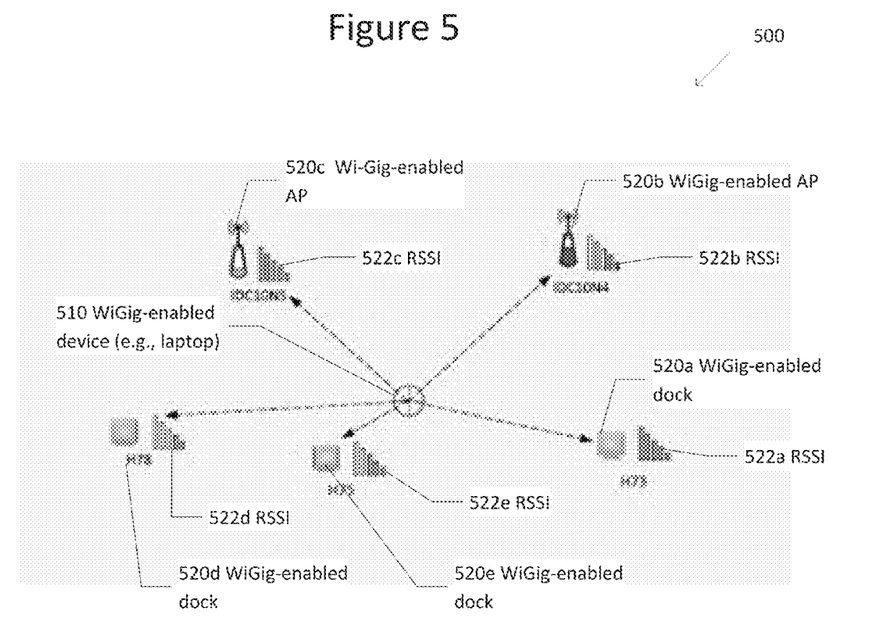
FIG. 5 illustrates a schematic diagram of a display device of a WiGig-enabled device according to this disclosure.

FIG. 5 illustrates a schematic diagram of a display device 500 of a WiGig-enabled device 410 according to this disclosure.

When a user of the WiGig-enabled device 410 moves within a relatively close proximity to one or more WiGig-enabled stations 420, direction information as discussed above with respect to the WiGig system 100 of FIGS. 1A, 1B, 2, and 3 to each WiGig-enabled station 420 is presented graphically on the display device 500 of the WiGig-enabled device 410. The user can use this information to find a particular WiGig-enabled station 420, turn the WiGig-enabled device 410 to face the desired WiGig-enabled station 420, or choose a WiGig-enabled station 420 that has line of sight (LOS) to the WiGig-enabled device 410.

As discussed above, the directions are obtained using WiGig beamforming training. As the user approaches a group of cubicles with WiGig-enabled stations 420, the WiGig-enabled device 410 receives WiGig signals from the WiGig-enabled stations 420 and performs a transmit sector sweep with each station 420, thereby generating transmit directions. The WiGig-enabled stations 420 are then shown on the display device 500. Rather than showing the WiGig-enabled stations 420 as a mere list, the stations 420 are displayed graphically with respective icons 520a-e (collectively, 520) indicating whether the particular WiGig-enabled station 420 is a dock or an AP.

More specifically, the receiving WiGig-enabled stations 420 are open to transmission with omni-directional antennas. The WiGig-enabled device 410 performs an initiator sector sweep actively in all directions whenever the WiGig-enabled device 410 is not connected to a WiGig-enabled station 420 (e.g., dock and/or AP) and listens for any responses. The WiGig-enabled device 410 then obtains responses, which includes the best signal quality transmit sector/index, from each of the WiGig-enabled stations 420 that are in the vicinity and are not connected to too many other devices. The WiGig-enabled device 410 then responds with a directed transmission to a WiGig-enabled stations 420.

The WiGig-enabled device 410, whether stationary or moving, performs a sector sweep with several WiGig-enabled stations 420 in the vicinity. Each of the WiGig-enabled stations 420 responds with both direction and quality of transmission. This information is then displayed on the display device 500 so the user will know where the other WiGig-enabled stations 420 are located. The user then has information as to how to get to a specific cubicle with corresponding WiGig-enabled station 420.

Direction and indication of quality of the reception is displayed for each of the WiGig-enabled stations 420 as long as the WiGig-enabled device 410 is not connected. Once the WiGig-enabled device 410 is connected, the WiGig-enabled device 410 may stop sweeping if the system is designed for the WiGig-enabled device 410 to connect to a single WiGig-enabled station 420 only. Alternatively, the WiGig-enabled device 410 can keep sweeping. Also WiGig-enabled device 410 could decide to connect to more than one WiGig-enabled stations 420, such as to both a dock and an access point.

The display device 500 may additionally show respective bar graphs 522 (522a-e) indicating link quality. The link quality may be determined in any known manner. Also, the WiGig-enabled stations 420 may be color coded for load, which is based on number of WiGig-enabled devices 410 connected thereto and the amount of transmit/receive time in a prior predetermined period of time, for example, ten minutes. For example, a WiGig-enabled station 420 may be shown in red if greater than a predetermined number of WiGig-enabled devices 410 is connected thereto in the previous ten minutes. Alternatively, the link quality may be based on the Received Signal Strength Indicator (RSSI).

Further, a fine time measurement protocol may be performed to determine distances between the WiGig-enabled device 410 and the respective WiGig-enabled stations 420. This protocol involves the WiGig-enabled device 410 transmitting a first packet, a WiGig-enabled station 420 transmitting a response with either a specific time or at a specific delay from the first packet. Then the WiGig-enabled device 410 receives the response, and uses this response to estimate the distance between the two devices. The relative distances between the WiGig-enabled device 410 and the respective WiGig-enabled stations 420 may then be indicated on the display device 500.

The display device 500 may cease to display the icons when the user selects one the displayed WiGig-enabled stations 420 for connection or closes the display window.

Figure 6:
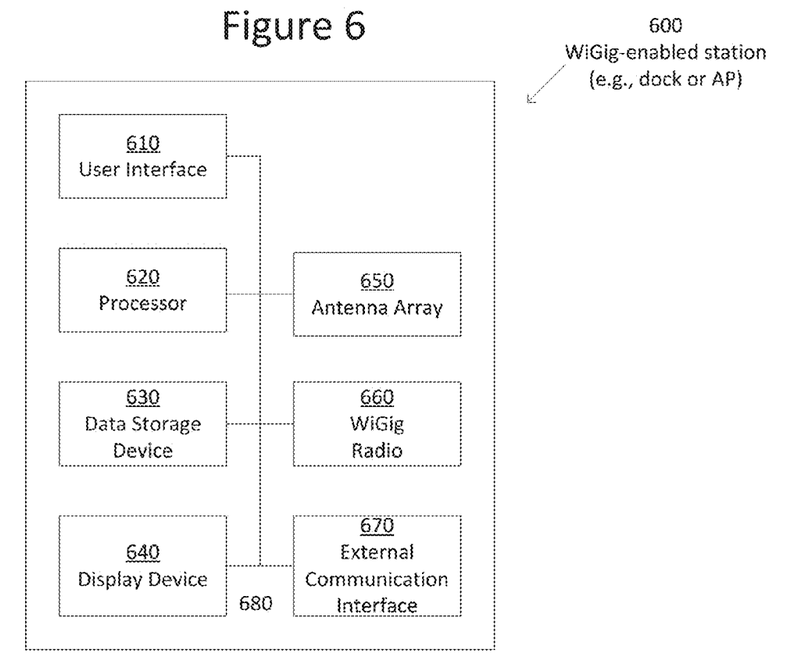
FIG. 6 illustrates a block diagram of an exemplary WiGig-enabled wireless dock or access point (AP) for use with the systems and methods according to this disclosure.

FIG. 6 illustrates a block diagram of an exemplary WiGig-enabled station (e.g., dock or AP) 600 for use with the systems and methods according to this disclosure.

The dock/AP 600 may include its own user interface 610 by which a user may communicate with the other components of the dock/AP 600. The user interface 610 in the dock/AP 600 may include similar devices to those described above with reference to the user interface 210 in the WiGig-enabled device 200. Alternatively, the user interface 610 may comprise a separate keyboard and mouse, or other user interface device such as, for example, a portable data storage medium and compatible data storage medium reader that the user may employ to input data and/or instructions to the dock/AP 600.

The dock/AP 600 may include one or more processors 620 that are configured to carry into effect the determinations and control functions, including signal transmission control and sequencing. It is anticipated that most of the determinations regarding signal transmission sequencing that may facilitate establishing WiGig communication with one or more devices will be undertaken by the processor(s) 620 in the dock/AP 600, possibly based on information provided by a user via the user interface 610.

The dock/AP 600 may include one or more data storage devices 630. The data storage device(s) 630 may be used for static or dynamic storage of data to be transmitted to one or more devices. The data storage device(s) 630 may be segregated according to the type of data stored, or the communication link for which the data is stored when more than a WiGig radio 660 may be a part of the dock/AP 600.

The dock/AP 600 may include its own display device 640 that may be configured as a conventional display device by which to inform the user regarding operation of the dock/AP 600 and/or status of the communication links or devices in communication with the dock/AP 600 for monitoring purposes.

The dock/AP 600 may include an antenna array 650. As discussed above, an antenna array is a set of individual antennas configured to transmit and/or receive radio waves. Also, the antenna array 650 may alternatively be a switch beam antenna, a mechanically moving antenna, or other directional antenna.

The dock/AP 600 may include a WiGig radio 660. The WiGig radio 660 may include an integral WiGig transceiver, or otherwise may include separate transmitter and receiver devices. It should be noted that the dock/AP 600 may include other radios for establishing communication links in other portions of the licensed or unlicensed RF spectrum including, for example, a Wi-Fi radio or a cellular telephone radio. It may also be connected to other communication devices using cables such as Ethernet cables.

The dock/AP 600 may include one or more external communication interfaces 670 by which data and application information may be exchanged with a network that the dock/AP 600 supports for effecting WiGig communication with one or more WiGig-enabled devices to facilitate the device(s) exchanging data with, and executing applications hosted on, the network. The external communication interface 670 may be configured to facilitate wired or wireless communication according to any protocol that may be available for data exchange and application execution communications with the network supported by the dock/AP 600.

All of the various components of the dock/AP 600, as depicted in FIG. 6, may be connected by one or more data/control busses 680. The data/control bus(ses) 680 may provide wired or wireless communication between the various components of the dock/AP 600, whether locally housed together in a single unit or remotely dispersed in multiple individual facilities.

It should be appreciated that, although depicted in FIG. 6 as an integral unit, the various disclosed elements of the dock/AP 600 may be arranged in any combination of subsystems as individual components or combinations of components, housed in a single location or remotely dispersed in multiple locations and in wired or wireless communication with other of the individual components of the dock/AP 600. In other words, no specific configuration as an integral unit or as a support unit, or as several units or sub-systems widely dispersed, for the dock/AP 600 is to be implied by the depiction in FIG. 6.

Figure 7:
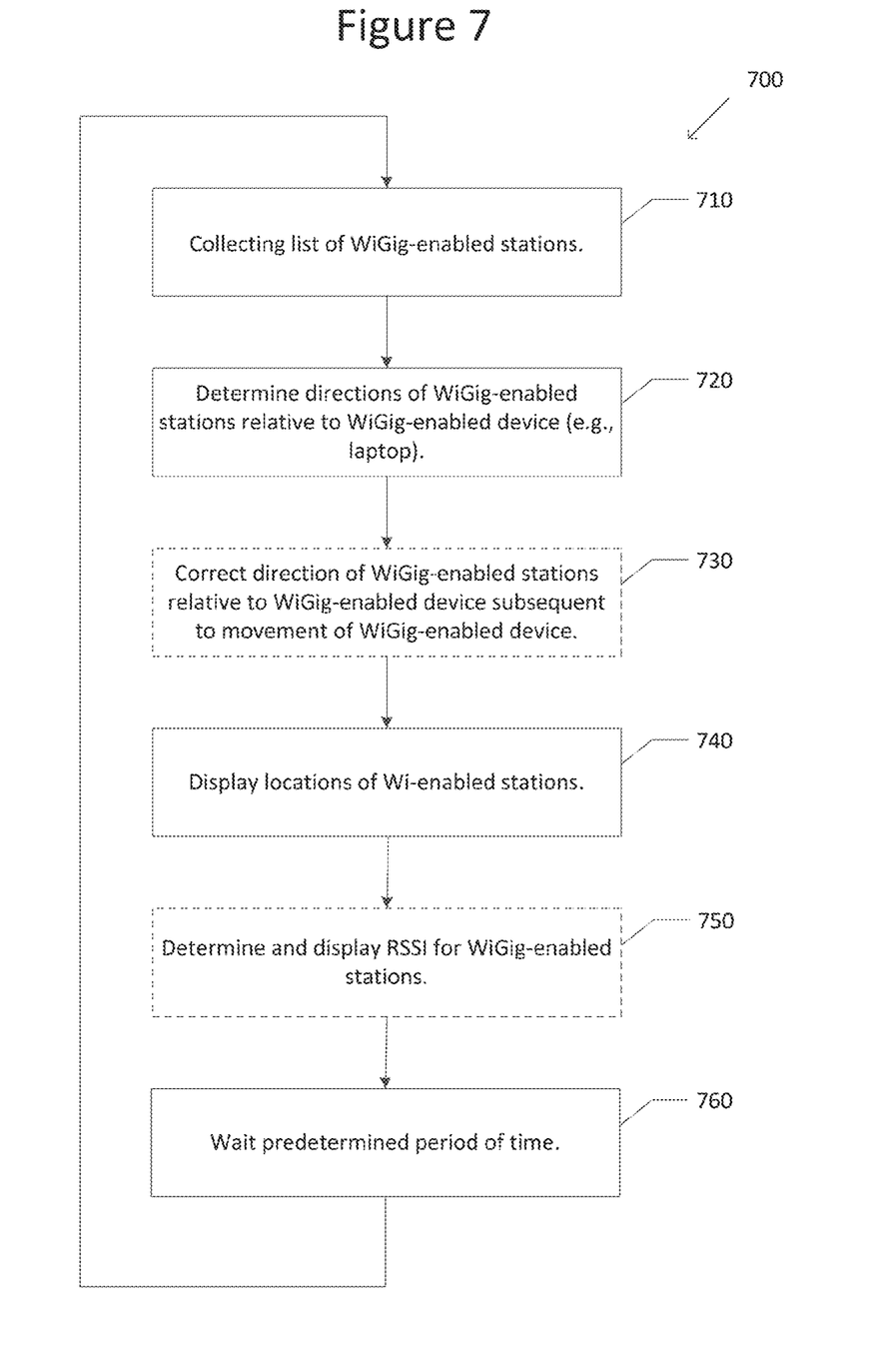
FIG. 7 illustrates a flowchart of a method of configuring a WiGig-enabled device according to this disclosure.

FIG. 7 illustrates a flowchart 700 of a method of configuring a WiGig-enabled device 410 according to this disclosure.

In Step 710, a list of WiGig-enabled stations 420 is collected. The list is collected by performing transmit sector sweeps and collecting responses from devices 420.

In Step 720, directions of WiGig-enabled stations 420 relative to WiGig-enabled device 410 are determined.

Optionally, in Step 730, the directions of the WiGig-enabled stations 420 relative to WiGig-enabled device 410 subsequent to movement of WiGig-enabled device 410 may be corrected. The WiGig-enabled device 410 does not perform transmit sweeps continuously so as to conserve power. Laptops and smartphones, for example, have an accelerometer (comprised within the movement sensor 270 of FIG. 2), which are presumed to operate continuously. The accelerometer indicates in combination with a compass an actual direction at which the laptop was placed referenced to a set of earth coordinates. If after obtaining the direction between the WiGig-enabled device 410 and the WiGig-enabled station 420 the WiGig-enabled device 410 is moved or turned, it is possible to know how the WiGig-enabled device 410 was turned. This information can be used to correct the direction that was determined previously to be the currently-accurate direction. For example, if the bore-sight of the antenna array of the WiGig-enabled device 410 was pointed in azimuth $\theta_1$ and elevation $\phi_1$ at time $t_1$ when the sector sweep with a specific WiGig-enabled station 420 was performed, and the accelerometers and compass in the WiGig-enabled device 410 indicate that at time $t_2$ the WiGig-enabled device 410 has turned to azimuth $\theta_2$ and elevation $\phi_2$, the directions displayed on the display 500 at $t_2$ should be corrected in the azimuth by a $\theta_2 - \theta_1$ and by $\phi_2 - \phi_1$ the elevation.

In Step 740, locations of the WiGig-enabled stations 420 are displayed.

In Step 750, optionally, RSSIs for the WiGig-enabled stations 420 are determined and displayed on the WiGig-enabled device 410.

In Step 760, the WiGig-enabled device 410 waits for a predetermined period of time, and then repeats the process from Step 710.

Example 1 is a method for configuring a wireless high frequency directed communication-enabled device, comprising: performing a transmit sector sweep during a beamforming training between the wireless high frequency directed communication-enabled device and a wireless high frequency directed communication-enabled station, wherein the station is a dock or access point (AP); indexing sectors into an ordered set of directive transmissions; determining a relative direction of the wireless high frequency directed communication-enabled station with respect to the wireless high frequency directed communication-enabled device based on the indexed sectors; and configuring the wireless high frequency directed communication-enabled device with the relative direction of the wireless high frequency directed communication-enabled station.

In Example 2, the subject matter of Example 1, wherein the relative position of the wireless high frequency directed communication-enabled station is to the left of the wireless high frequency directed communication-enabled device.

In Example 3, the subject matter of Example 1, wherein the relative position of the wireless high frequency directed communication-enabled station is to the right of the wireless high frequency directed communication-enabled device.

In Example 4, the subject matter of Example 1, wherein the configuring further comprises configuring the wireless high frequency directed communication-enabled device to display graphically a Received Signal Strength Indicator (RSSI) for the wireless high frequency directed communication-enabled station.

In Example 5, the subject matter of Example 1, further comprising performing a fine time measurement protocol to determine a distance between the wireless high frequency directed communication-enabled device and the wireless high frequency directed communication-enabled station, wherein the configuring further comprises configuring the wireless high frequency directed communication-enabled device to display graphically the distance between the wireless high frequency directed communication-enabled device and the wireless high frequency directed communication-enabled station.

In Example 6, the subject matter of Example 1, further comprising: performing a transmit sector sweep during a beamforming training between the wireless high frequency directed communication-enabled device and each of a plurality of wireless high frequency directed communication-enabled stations; indexing sectors into respective ordered sets of directive transmissions for each of the plurality of wireless high frequency directed communication-enabled stations; determining a relative direction of each of the plurality of wireless high frequency directed communication-enabled stations with respect to the wireless high frequency directed communication-enabled device based on the indexed sectors; and configuring the wireless high frequency directed communication-enabled device based on the relative directions.

In Example 7, the subject matter of Example 6, wherein the configuring comprises configuring the wireless high frequency directed communication-enabled device to display graphically directions of the respective plurality of wireless high frequency directed communication-enabled stations relative to the wireless high frequency directed communication-enabled device.

In Example 8, the subject matter of Example 6, wherein the configuring further comprises configuring the wireless high frequency directed communication-enabled device to display graphically Received Signal Strength Indicators (RSSIs) for the respective plurality of wireless high frequency directed communication-enabled stations.

In Example 9, the subject matter of Example 6, further comprising performing a fine time measurement protocol to determine distances between the wireless high frequency directed communication-enabled device and the respective plurality of wireless high frequency directed communication-enabled stations; and wherein the configuring further comprises configuring the wireless high frequency directed communication-enabled device to display graphically the distances between the wireless high frequency directed communication-enabled device and the respective plurality of wireless high frequency directed communication-enabled stations.

In Example 10, the subject matter of Example 1, wherein the wireless high frequency directed communication-enabled station comprises a wireless high frequency directed communication-enabled external display.

In Example 11, the subject matter of Example 1, further comprising: sensing movement of the wireless high frequency directed communication-enabled device; and correcting the relative direction of the wireless high frequency directed communication-enabled station with respect to the wireless high frequency directed communication-enabled device based on the sensed movement.

Example 12 is a wireless high frequency directed communication-enabled device, comprising: an antenna; and a processor configured to: perform a transmit sector sweep during a beamforming training between the antenna and an antenna of a wireless high frequency directed communication-enabled station, wherein the station is a dock or access point (AP); index sectors into an ordered set of directive transmissions; determine a relative position of the wireless high frequency directed communication-enabled station with respect to the wireless high frequency directed communication-enabled device based on the indexed sectors; and configure the wireless high frequency directed communication-enabled device with the relative position of the wireless high frequency directed communication-enabled station.

In Example 13, the subject matter of Example 12, wherein the relative position of the wireless high frequency directed communication-enabled station is to the left of the wireless high frequency directed communication-enabled device.

In Example 14, the subject matter of Example 12, wherein the relative position of the wireless high frequency directed communication-enabled station is to the right of the wireless high frequency directed communication-enabled device.

In Example 15, the subject matter of Example 12, wherein the processor is further configured to: configure the wireless high frequency directed communication-enabled device to display graphically a Received Signal Strength Indicator (RSSI) for the wireless high frequency directed communication-enabled station.

In Example 16, the subject matter of Example 12, wherein the processor is further configured to: perform a fine time measurement protocol to determine a distance between the wireless high frequency directed communication-enabled device and the wireless high frequency directed communication-enabled station; and configure the wireless high frequency directed communication-enabled device to display graphically relative the distance between the wireless high frequency directed communication-enabled device and the wireless high frequency directed communication-enabled station.

In Example 17, the subject matter of Example 12, wherein the processor is further configured to: perform a transmit sector sweep during a beamforming training between the antenna of the wireless high frequency directed communication-enabled device and antennas of each of a plurality of wireless high frequency directed communication-enabled stations; index sectors into respective ordered sets of directive transmissions for each of the plurality of wireless high frequency directed communication-enabled stations; determine a relative direction of each of the plurality of wireless high frequency directed communication-enabled stations with respect to the wireless high frequency directed communication-enabled device based on the indexed sectors; and configure the wireless high frequency directed communication-enabled device based on the relative directions.

In Example 18, the subject matter of Example 17, wherein the processor is further configured to: configure the wireless high frequency directed communication-enabled device to display graphically directions of the respective plurality of wireless high frequency directed communication-enabled stations relative to the wireless high frequency directed communication-enabled device.

In Example 19, the subject matter of Example 17, wherein the processor is further configured to: configure the wireless high frequency directed communication-enabled device to display graphically Received Signal Strength Indicators (RSSIs) for the respective plurality of wireless high frequency directed communication-enabled stations.

In Example 20, the subject matter of Example 17, wherein the processor is further configured to: perform a fine time measurement protocol to determine distances between the wireless high frequency directed communication-enabled device and the respective plurality of wireless high frequency directed communication-enabled stations; and configure the wireless high frequency directed communication-enabled device to display graphically relative distances between the wireless high frequency directed communication-enabled device and the respective plurality of wireless high frequency directed communication-enabled stations.

In Example 21, the subject matter of Example 12, wherein the wireless high frequency directed communication-enabled station comprises a wireless high frequency directed communication-enabled external display.

In Example 22, the subject matter of Example 12, further comprising a movement sensor configured to sense movement of the wireless high frequency directed communication-enabled device, wherein the processor is further configured to correct the relative direction of the wireless high frequency directed communication-enabled station based on the sensed movement.

In Example 23, the subject matter of any of Examples 1-3, wherein the configuring further comprises configuring the wireless high frequency directed communication-enabled device to display graphically a Received Signal Strength Indicator (RSSI) for the wireless high frequency directed communication-enabled station.

In Example 24, the subject matter of any of Examples 1-4, further comprising performing a fine time measurement protocol to determine a distance between the wireless high frequency directed communication-enabled device and the wireless high frequency directed communication-enabled station, wherein the configuring further comprises configuring the wireless high frequency directed communication-enabled device to display graphically the distance between the wireless high frequency directed communication-enabled device and the wireless high frequency directed communication-enabled station.

In Example 25, the subject matter of any of Examples 1-5, further comprising: performing a transmit sector sweep during a beamforming training between the wireless high frequency directed communication-enabled device and each of a plurality of wireless high frequency directed communication-enabled stations; indexing sectors into respective ordered sets of directive transmissions for each of the plurality of wireless high frequency directed communication-enabled stations; determining a relative direction of each of the plurality of wireless high frequency directed communication-enabled stations with respect to the wireless high frequency directed communication-enabled device based on the indexed sectors; and configuring the wireless high frequency directed communication-enabled device based on the relative directions.

In Example 26, the subject matter of any of Examples 6-7, wherein the configuring further comprises configuring the wireless high frequency directed communication-enabled device to display graphically Received Signal Strength Indicators (RSSIs) for the respective plurality of wireless high frequency directed communication-enabled stations.

In Example 27, the subject matter of any of Examples 6-8, further comprising performing a fine time measurement protocol to determine distances between the wireless high frequency directed communication-enabled device and the respective plurality of wireless high frequency directed communication-enabled stations; and wherein the configuring further comprises configuring the wireless high frequency directed communication-enabled device to display graphically the distances between the wireless high frequency directed communication-enabled device and the respective plurality of wireless high frequency directed communication-enabled stations.

In Example 28, the subject matter of any of Examples 1-9, wherein the wireless high frequency directed communication-enabled station comprises a wireless high frequency directed communication-enabled external display.

In Example 29, the subject matter of any of Examples 1-5 and 10, further comprising: sensing movement of the wireless high frequency directed communication-enabled device; and correcting the relative direction of the wireless high frequency directed communication-enabled station with respect to the wireless high frequency directed communication-enabled device based on the sensed movement.

In Example 30, the subject matter of any of Examples 17-18, wherein the processor is further configured to: configure the wireless high frequency directed communication-enabled device to display graphically Received Signal Strength Indicators (RSSIs) for the respective plurality of wireless high frequency directed communication-enabled stations.

In Example 31, the subject matter of any of Examples 17-19, wherein the processor is further configured to: perform a fine time measurement protocol to determine distances between the wireless high frequency directed communication-enabled device and the respective plurality of wireless high frequency directed communication-enabled stations; and configure the wireless high frequency directed communication-enabled device to display graphically relative distances between the wireless high frequency directed communication-enabled device and the respective plurality of wireless high frequency directed communication-enabled stations.

In Example 32, the subject matter of any of Examples 12-20, wherein the wireless high frequency directed communication-enabled station comprises a wireless high frequency directed communication-enabled external display.

In Example 33, the subject matter of any of Examples 12-16 and 21, further comprising a movement sensor configured to sense movement of the wireless high frequency directed communication-enabled device, wherein the processor is further configured to correct the relative direction of the wireless high frequency directed communication-enabled station based on the sensed movement.

Example 34 is a wireless high frequency directed communication-enabled device, comprising: an antenna; and a processing means for: performing a transmit sector sweep during a beamforming training between the antenna and an antenna of a wireless high frequency directed communication-enabled station, wherein the station is a dock or access point (AP); indexing sectors into an ordered set of directive transmissions; determining a relative position of the wireless high frequency directed communication-enabled station with respect to the wireless high frequency directed communication-enabled device based on the indexed sectors; and configuring the wireless high frequency directed communication-enabled device with the relative position of the wireless high frequency directed communication-enabled station.

In Example 35, the subject matter of Example 34, wherein the relative position of the wireless high frequency directed communication-enabled station is to the left of the wireless high frequency directed communication-enabled device.

In Example 36, the subject matter of Example 34, wherein the relative position of the wireless high frequency directed communication-enabled station is to the right of the wireless high frequency directed communication-enabled device.

In Example 37, the subject matter of Example 34, wherein the processing means is further for: configuring the wireless high frequency directed communication-enabled device to display graphically a Received Signal Strength Indicator (RSSI) for the wireless high frequency directed communication-enabled station.

In Example 38, the subject matter of Example 34, wherein the processing means is further for: performing a fine time measurement protocol to determine a distance between the wireless high frequency directed communication-enabled device and the wireless high frequency directed communication-enabled station; and configuring the wireless high frequency directed communication-enabled device to display graphically relative the distance between the wireless high frequency directed communication-enabled device and the wireless high frequency directed communication-enabled station.

In Example 39, the subject matter of Example 34, wherein the processing means is further for: performing a transmit sector sweep during a beamforming training between the antenna of the wireless high frequency directed communication-enabled device and antennas of each of a plurality of wireless high frequency directed communication-enabled stations; indexing sectors into respective ordered sets of directive transmissions for each of the plurality of wireless high frequency directed communication-enabled stations; determining a relative direction of each of the plurality of wireless high frequency directed communication-enabled stations with respect to the wireless high frequency directed communication-enabled device based on the indexed sectors; and configuring the wireless high frequency directed communication-enabled device based on the relative directions.

In Example 40, the subject matter of Example 39, wherein the processing means is further for: configuring the wireless high frequency directed communication-enabled device to display graphically directions of the respective plurality of wireless high frequency directed communication-enabled stations relative to the wireless high frequency directed communication-enabled device.

In Example 41, the subject matter of any of Examples 39-40, wherein the processing means is further for: configuring the wireless high frequency directed communication-enabled device to display graphically Received Signal Strength Indicators (RSSIs) for the respective plurality of wireless high frequency directed communication-enabled stations.

In Example 42, the subject matter of any of Examples 39-41, wherein the processing means is further for: performing a fine time measurement protocol to determine distances between the wireless high frequency directed communication-enabled device and the respective plurality of wireless high frequency directed communication-enabled stations; and configuring the wireless high frequency directed communication-enabled device to display graphically relative distances between the wireless high frequency directed communication-enabled device and the respective plurality of wireless high frequency directed communication-enabled stations.

In Example 43, the subject matter of any of Examples 34-38, wherein the wireless high frequency directed communication-enabled station comprises a wireless high frequency directed communication-enabled external display.

In Example 44, the subject matter of any of Examples 34-38, further comprising a movement sensing means for sensing movement of the wireless high frequency directed communication-enabled device, wherein the processing means is further for correcting the relative direction of the wireless high frequency directed communication-enabled station based on the sensed movement.

Example 45 is an apparatus as substantially shown and described.

Example 46 is a method as substantially shown and described.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A method for configuring a wireless high frequency directed communication-enabled device, comprising:
    performing a transmit sector sweep during a beamforming training between the wireless high frequency directed communication-enabled device and a wireless high frequency directed communication-enabled station, wherein the station is a dock or access point (AP);
    indexing sectors into an ordered set of directive transmissions;
    determining a relative direction of the wireless high frequency directed communication-enabled station with respect to the wireless high frequency directed communication-enabled device based on the indexed sectors; and
    configuring the wireless high frequency directed communication-enabled device with the relative direction of the wireless high frequency directed communication-enabled station.

2. The method of claim 1, wherein the relative position of the wireless high frequency directed communication-enabled station is to the left of the wireless high frequency directed communication-enabled device.

3. The method of claim 1, wherein the relative position of the wireless high frequency directed communication-enabled station is to the right of the wireless high frequency directed communication-enabled device.

4. The method of claim 1, wherein the configuring further comprises configuring the wireless high frequency directed communication-enabled device to display graphically a Received Signal Strength Indicator (RSSI) for the wireless high frequency directed communication-enabled station.

5. The method of claim 1,
    further comprising performing a fine time measurement protocol to determine a distance between the wireless high frequency directed communication-enabled device and the wireless high frequency directed communication-enabled station,
    wherein the configuring further comprises configuring the wireless high frequency directed communication-enabled device to display graphically the distance between the wireless high frequency directed communication-enabled device and the wireless high frequency directed communication-enabled station.

6. The method of claim 1, further comprising:
performing a transmit sector sweep during a beamforming training between the wireless high frequency directed communication-enabled device and each of a plurality of wireless high frequency directed communication-enabled stations;
indexing sectors into respective ordered sets of directive transmissions for each of the plurality of wireless high frequency directed communication-enabled stations;
determining a relative direction of each of the plurality of wireless high frequency directed communication-enabled stations with respect to the wireless high frequency directed communication-enabled device based on the indexed sectors; and
configuring the wireless high frequency directed communication-enabled device based on the relative directions.

7. The method of claim 6, wherein the configuring comprises configuring the wireless high frequency directed communication-enabled device to display graphically directions of the respective plurality of wireless high frequency directed communication-enabled stations relative to the wireless high frequency directed communication-enabled device.

8. The method of claim 6, wherein the configuring further comprises configuring the wireless high frequency directed communication-enabled device to display graphically Received Signal Strength Indicators (RSSIs) for the respective plurality of wireless high frequency directed communication-enabled stations.

9. The method of claim 6,
further comprising performing a fine time measurement protocol to determine distances between the wireless high frequency directed communication-enabled device and the respective plurality of wireless high frequency directed communication-enabled stations; and
wherein the configuring further comprises configuring the wireless high frequency directed communication-enabled device to display graphically the distances between the wireless high frequency directed communication-enabled device and the respective plurality of wireless high frequency directed communication-enabled stations.

10. The method of claim 1, wherein the wireless high frequency directed communication-enabled station comprises a wireless high frequency directed communication-enabled external display.

11. The method of claim 1, further comprising:
sensing movement of the wireless high frequency directed communication-enabled device; and
correcting the relative direction of the wireless high frequency directed communication-enabled station with respect to the wireless high frequency directed communication-enabled device based on the sensed movement.

12. A wireless high frequency directed communication-enabled device, comprising:
an antenna; and
a processor configured to:
perform a transmit sector sweep during a beamforming training between the antenna and an antenna of a wireless high frequency directed communication-enabled station, wherein the station is a dock or access point (AP);
index sectors into an ordered set of directive transmissions;
determine a relative position of the wireless high frequency directed communication-enabled station with respect to the wireless high frequency directed communication-enabled device based on the indexed sectors; and
configure the wireless high frequency directed communication-enabled device with the relative position of the wireless high frequency directed communication-enabled station.

13. The wireless high frequency directed communication-enabled device of claim 12, wherein the relative position of the wireless high frequency directed communication-enabled station is to the left of the wireless high frequency directed communication-enabled device.

14. The wireless high frequency directed communication-enabled device of claim 12, wherein the relative position of the wireless high frequency directed communication-enabled station is to the right of the wireless high frequency directed communication-enabled device.

15. The wireless high frequency directed communication-enabled device of claim 12, wherein the processor is further configured to:
configure the wireless high frequency directed communication-enabled device to display graphically a Received Signal Strength Indicator (RSSI) for the wireless high frequency directed communication-enabled station.

16. The wireless high frequency directed communication-enabled device of claim 12, wherein the processor is further configured to:
perform a fine time measurement protocol to determine a distance between the wireless high frequency directed communication-enabled device and the wireless high frequency directed communication-enabled station; and
configure the wireless high frequency directed communication-enabled device to display graphically relative the distance between the wireless high frequency directed communication-enabled device and the wireless high frequency directed communication-enabled station.

17. The wireless high frequency directed communication-enabled device of claim 12, wherein the processor is further configured to:
perform a transmit sector sweep during a beamforming training between the antenna of the wireless high frequency directed communication-enabled device and antennas of each of a plurality of wireless high frequency directed communication-enabled stations;
index sectors into respective ordered sets of directive transmissions for each of the plurality of wireless high frequency directed communication-enabled stations;
determine a relative direction of each of the plurality of wireless high frequency directed communication-enabled stations with respect to the wireless high frequency directed communication-enabled device based on the indexed sectors; and
configure the wireless high frequency directed communication-enabled device based on the relative directions.

18. The wireless high frequency directed communication-enabled device of claim 17, wherein the processor is further configured to:
configure the wireless high frequency directed communication-enabled device to display graphically directions of the respective plurality of wireless high frequency directed communication-enabled stations relative to the wireless high frequency directed communication-enabled device.

19. The wireless high frequency directed communication-enabled device of claim 17, wherein the processor is further configured to:
configure the wireless high frequency directed communication-enabled device to display graphically Received Signal Strength Indicators (RSSIs) for the respective plurality of wireless high frequency directed communication-enabled stations.

20. The wireless high frequency directed communication-enabled device of claim 17, wherein the processor is further configured to:
perform a fine time measurement protocol to determine distances between the wireless high frequency directed communication-enabled device and the respective plurality of wireless high frequency directed communication-enabled stations; and
configure the wireless high frequency directed communication-enabled device to display graphically relative distances between the wireless high frequency directed communication-enabled device and the respective plurality of wireless high frequency directed communication-enabled stations.

21. The wireless high frequency directed communication-enabled device of claim 12, wherein the wireless high frequency directed communication-enabled station comprises a wireless high frequency directed communication-enabled external display.

22. The wireless high frequency directed communication-enabled device of claim 12,
further comprising a movement sensor configured to sense movement of the wireless high frequency directed communication-enabled device,
wherein the processor is further configured to correct the relative direction of the wireless high frequency directed communication-enabled station based on the sensed movement.

* * * * *